324-77 CROSS REFERENCE SEARCH ROOM

INVENTOR

James W. Jones

ADAPTIVE SPEECH PATTERN RECOGNITION SYSTEM

Filed Nov. 1, 1968 5 Sheets-Sheet 2

INVENTOR

James W. Jones

PULSE GENERATING CIRCUIT

DECISION DEVICE

ADAPTIVE VECTOR SUBTRACTION DEVICE

INVENTOR
James W. Jones

ADAPTIVE MEAN SUBTRACTION DEVICE

ADAPTIVE WHITENING FILTER

INVENTOR

James W. Jones

ADAPTIVE TRANSFORMATION ELEMENT

ADAPTIVE AMPLIFIER

INVENTOR

James W. Jones

United States Patent Office 3,509,280
Patented Apr. 28, 1970

3,509,280
ADAPTIVE SPEECH PATTERN RECOGNITION SYSTEM

James W. Jones, Granada Hills, Calif., assignor to International Telephone and Telegraph Corporation, Nutley, N.J., a corporation of Delaware Continuation-in-part of application Ser. No. 525,921, Feb. 8, 1966. This application Nov. 1, 1968, Ser. No. 772,631
Int. Cl. G10l 1/04; H04m 1/24
U.S. Cl. 179—1 6 Claims

ABSTRACT OF THE DISCLOSURE

The present invention concerns a unique system for automatic recognition of a given speaker or voice based on comparison of basic speech sounds (phonemes) from a newly spoken or recorded speech sample with the previously "learned" phoneme pattern of a known voice. The device gives automatic recognition or rejection in the form of a yes/no type of signal and has a high probability for correct determination.

The device acts on the principle that each voice has a unique "voice print" in the form of a unique statistical behavior of the temporal spectral properties whenever a speaker enounces a particular phoneme. Such statistical behavior is unique both for the phoneme and for the individual speaker, and accordingly the text, or even the language spoken in the unknown sampling, need not be the same as in the sample which the device has "learned" previously.

Instrumentation includes a preprocessing device, phoneme classification device, adaptive classification device and decision and control circuits.

CROSS REFERENCES TO RELATED APPLICATIONS

This application is a continuation-in-part of U.S. patent application of James W. Jones, Ser. No. 525,921 filed Feb. 8, 1966, now abandoned entitled "Adaptive Pattern Recognition System." The disclosure of the aforementioned patent application is incorporated herein by reference.

BACKGROUND OF THE INVENTION

Field of the invention

This invention relates generally to electronic devices for recognition of patterns within the electrical analog signals corresponding to physical phenomena. More particularly, the invention relates to speech pattern recognition devices having as one use the recognition of an individual speaker.

Description of the prior art

The present invention breaks into a relatively new area in the electronic arts. No prior device for recognizing the identity of a speaker from samples of his speech taken in random context is known. This capability contrasts with such prior art as that of the Bell "Voiceprint." That prior art device requires inspection of printed records by human operators and also requires that the person speaking pronounce predetermined words.

It is understood that prior art work by Dr. Bernard Woodrow at Leland Stanford University, has resulted in development of pattern recognition devices ("Adeline" and "Madaline") which, although adaptive (capable of "learning") in the broad sense, require prior samples of the class to be recognized in addition to samples of classes not to be recognized. The present invention, on the other hand, requires only samples of the class to be recognized in order to set up the memory of the device.

SUMMARY OF THE INVENTION

The system of the present invention provides automatic recognition of the voice of any given person after the device has been exposed to prior samples of the speech of that person.

The system is capable of operation in either of two modes, namely, a "learning" mode, and a "recognition" mode.

In the learning mode, the input to the device normally consists of either continuous or successive samples of speech from a single speaker. The values stored in the memory elements of the device automatically change according to the statistical behavior of the input, so that subsequent samples of speech from that speaker can be recognized.

In the recognition mode, the input to the device normally consists of either continuous or successive samples of speech from a speaker whose identity is unknown. The output of the device is either inactive, indicating that a decision is not yet available, or consists of a binary decision representing acceptance or rejection of the hypothesis that the speaker is that speaker whose selected voice characteristics were "learned" during the learning mode. The decision is correct with a high degree of probability.

The present invention comprises several distinct advances in this art. The word "adaptive" refers to its ability to "learn" and "remember" predetermined characteristics of a known speaker's voice sampled in random context.

The system of the present invention operates on the principle that whenever a speaker pronounces one of the basic sounds used in speech communication, the temporal spectral properties of the speech waveform have a unique statistical behavior. This statistical behavior is not only unique for the phoneme, but it is also unique for the speaker.

To produce one of these basic speech sounds, which are called phonemes, the speaker causes his mouth and vocal cavities to assume a corresponding shape and generates either a vocal or hissed sound. The spectrum of the sound which is generated is modified by passage through the vocal cavities, since the vocal cavities act as an acoustic filter. Thus, a characteristic shape to the vocal cavities produces a speech waveform having a characteristic spectral pattern, and this can be recognized by a pattern recognition device. Also, since the vocal cavities tend to assume a unique shape corresponding to the physical makeup and the vocal habits of any individual, a pattern recognition device can identify the individual who is pronouncing the phoneme.

The device described herein then recognizes the voice of a given speaker on the basis of the statistical behavior of the speech specrum during the pronunication of some chosen phoneme.

To avoid the problem of requiring a speaker to pronounce only the chosen phoneme, the basic speaker recognition device operates in parallel with a phoneme recognition device. The function of this phoneme recognition device during the learning mode is to restrict the learning process to those intervals of time during which the phoneme is being pronounced. Similarly, during the recognition mode, the recognition process is constrained so that recognition is only based on speech samples corresponding to the pronunciation of that phoneme.

The classification process is essentially the same for phoneme recognition and speaker recognition. The speech waveform is first reduced to a set of values representing discrete samples of the spectral power by a device called a preprocessing device. These values are then applied to the input of an analog computer, called a classification device. This device effectively computes the likelihood that the spectrum is that of the phoneme or the speaker, and compares this value to a threshold.

To conserve equipment, the same preprocessing device is used for both phoneme recognition and speaker recognition. However, two separate classification devices are required. The phoneme classification device has a fixed response, corresponding to the phoneme chosen for the experiment. The response of the speaker classification device is adaptive during the learning mode of operation and it remains fixed during the recognition mode.

The operation of both classification devices is based on the fact that whenever a single phoneme is being pronounced, or whenever that phoneme is being pronounced by some one person, the output of a preprocessing device of the form described herein tends to have multivariate Gaussian statistics. One can then compute an appropriate likelihood value by simply forming a quadratic function of the variables representing the output from preprocessor. Using vector notation, this function can be defined as follows:

$$L(x)=(x-m)^T R(x-m)$$

where L is a function mapping the set of possible vectors $\{x\}$ onto the set of real values, $x$ is a column vector whose components represent the set of output potentials from the preprocessor, $m$ is a column vector whose components represent the mean values of the components of $x$, R is the inverse of the covariance matrix of the vector $x$, and $(x-m)^T$ is the transpose of the vector $(x-m)$. In conventional notation, $$L(x)=\sum_{i=1}^{n}\sum_{j=1}^{n}(x_i-m_i)(x_j-m_j)r_{ij}$$

where $\{x_i\}$ are the components of $x$, $\{m_i\}$ are the components of $m$, $\{r_{ij}\}$ are the elements of the matrix R, and $n$ is the number of components of the vector $x$.

It is convenient to implement this operation in the following way.

First, we form the vector $y$ as follows:

$$y=x-m$$

Next, we multiply $y$ by a matrix W to obtain a new vector $z$ as follows:

$$z=Wy$$

Finally, we produce the value of the likelihood function by forming the inner product, $$L(x)=z^T z$$

where $z^T$ is the transpose of the vector z.

In conventional notation, $$y_i=x_i-m_i \qquad i=1,2\ldots n$$

$$z_i=\sum_{j=1}^{n}w_{ij}y_j \qquad i=1,2\ldots n$$

$$L(x)=\sum_{i=1}^{n}z_i^2$$

where $\{w_{ij}\}$ are the elements of the matrix W.

The matrix W has a special significance.

This matrix is conventionally called a whitening matrix or whitening filter. Its properties are such that for the particular speech event to the recognized, $\{z_i\}$ are uncorrelated random variables with unit variance. The matrix W must then be related to the matrix R in the following way:

$$W^T W=R$$

One may show that for a given matrix R, there is no unique matrix, W. On the other hand, for a given matrix W, there is one and only one matrix R for which the above relationship holds. Thus, it follows that for a given matrix W, and for a given vector $m$ there is one and only one corresponding statistical pattern.

During the adaptive (learning) mode of operation, the function of the speaker classification device is to adjust the value of the vector $m$ and the matrix W so that they correspond to the statistical behavior of the vector $x$.

BRIEF DESCRIPTION OF THE DRAWINGS

For illustration and explanation of the principles of the present invention, drawings are provided as follows.

DETAILED DESCRIPTION

Figure 1:
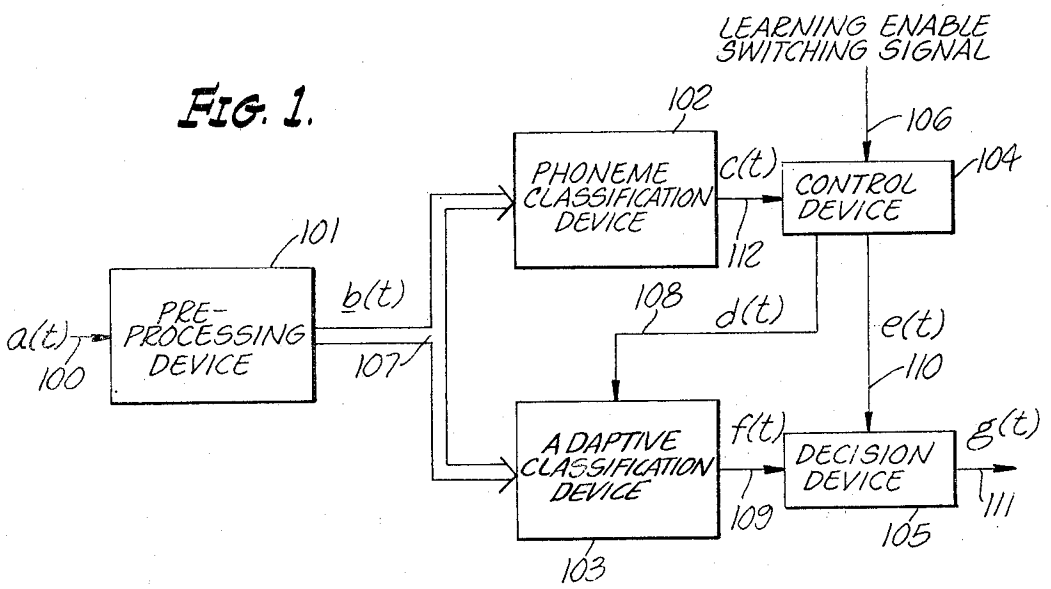
FIGURE 1 is a block diagram of the complete adaptive Speaker Recognition Device or System.

Referring now to FIGURE 1, a block diagram shows the overall adaptive pattern recognition device. Used in connection with and for the special purpose of speaker recognition, the system comprises a preprocessing device 101, a phoneme classification device 102, an adaptive classification device 103, a control device 104, and a decision device 105. The interconnections between these basic blocks will be described as this specification proceeds.

The input to the adaptive speaker recognition device 100 [labeled $a(t)$], consists of a complex wave audio frequency signal which is, in this case, speech waveform. A manually operated learning enable switch, or switching signal (not illustrated) is also provided as an input. This switch permits the speaker recognition system to be operated in either of two modes, namely "learning" or "recognition."

In the learning mode, the input is normally a speech waveform taken from a single known speaker. This can be derived from either an audio pickup system or a recording system.

Initially, the output 111, labeled $g(t)$, is inactive, indicating that the duration of the sample input signal is insufficient to permit subsequent recognition. After a sufficient "learning" period, an output signal will appear indicating a positive recognition decision. In the learning mode, that output signal indicates that the device has sufficient data stored, i.e., has learned to recognize the speaker's voice.

In the recognition mode of operation, $a(t)$, the input 100 to the adaptive speaker recognition device, normally consists of a speech waveform taken from a speaker whose identity is unknown. Again, the output 111 of the device, $g(t)$, is initially inactive, indicating that the elapsed time during which an input has been provided is insufficient for a firm decision. Subsequently an output consisting of a binary decision appears. This binary decision represents either acceptance or rejection of the hypothesis that the sample of speech applied to the input is derived from a particular speaker, namely, that speaker whose speech was applied to the input during the learning mode of operation.

During both the learning mode and the recognition mode, the input speech can be random context. The speakers in either the learning or recognition modes are not required to pronounce particular words or phrases. In fact, the speech applied to the input during the recognition mode may be in a different language from that used during the learning mode. The ability to made effective use of random context speech samples is a unique feature of this device.

The speech waveform $a(t)$ at 100 is applied to a device 101 called a preprocessing device. The function of this device is to convert the input $a(t)$ into a set of time-varying analog values representing the current spectral properties of the speech. This set of values is designated in FIGURE 1 as the vector $b(t)$ in the form of $n$ leads, each carrying an analog signal representative of spectral property variations in $n$ corresponding pass-bands in the audio domain.

The vector $b(t)$ is simultaneously applied in parallel to the inputs of two different devices, respectively called the phoneme classification device 102 and the adaptive classification device 103.

Presence at the output 112 of the phoneme classification device 102, of $c(t)$, is the binary signal indicating that a particular predetermined phoneme is currently being pronounced, a phoneme being a basic speech element, or basic sound used by the speaker in the pronunciation of a word. The purpose of the phoneme classification device is to restrict both the process of learning and the process of recognition to one involving only a single basic sound that occurs with a relatively high degree of frequency in normal speech context. Any one of several phonemes, for example, one of the vowel phonemes, is suitable for this purpose.

The binary signal, $c(t)$, is applied to the input 112 of the control device 104 in FIGURE 1. The function of this control device is twofold. During the learning mode, a switching signal, labeled $d(t)$, is generated and provided to the adaptive classification device 103 via lead 108. This switching signal permits the values stored in the memory elements of the adaptive classification device to vary when and only when the predetermined phoneme is being pronounced. During both the learning mode and the recognition mode, another switching signal, labeled $e(t)$ in FIGURE 1, is provided via lead 110 to the decision device 105. This permits the decision to be based on only those samples of speech that occur when the proper phoneme is being pronounced.

The output of the preprocessing device, the vector $b(t)$, is also applied to the input of the adaptive classification device 103, via leads 107. During both the learning mode and the recognition mode, an output on 109 labeled $f(t)$ appears. This output is a binary signal that indicates whether or not the input is currently a member of a class of inputs associated with the values stored in a set of memory elements to be described later. During the learning mode, the switching signal $d(t)$ will be turned on intermittently, according to whether or not the input speech waveform, $a(t)$, is, at the corresponding time interval, that phoneme chosen for the experiment. When the switching signal $d(t)$ is turned on, the values stored in the memory elements automatically adjust in a direction corresponding to the current statistical behavior of the input vector, $b(t)$. After a sufficient number of pronunications of the predetermined phoneme, the values stored in the memory elements will tend to converge on those values required for recognition.

Prior to the time when the values stored in the memory elements have converged on the proper values, $f(t)$, the output of the adaptive classification device 103, will have a value indicating continuous rejection of the hypothesis that the speaker at the input is the correct (same) speaker. That is, $f(t)$ will be a continuous negative potential representing a negative decision.

After convergence has taken place, $f(t)$ will intermittently change to a positive potential representing a positive decision. The intermittent changes will take place during short intervals of time when the predetermined phoneme is being pronounced.

The output of the adaptive classification process, $f(t)$, is applied to the input of the device 105 labeled decision device in FIGURE 1. The function of this device is to integrate the value of $f(t)$ over those significant intervals of time when the said predetermined phoneme is being pronounced. Thus, during intervals of time when the switching signal $e(t)$ is turned on, the value of $f(t)$ is applied to an integrator within 105. This integrator will be more fully described in connection with FIGURE 7 subsequently. If the value of $f(t)$ is positive, the value stored in that integrator increases, but if the value of $f(t)$ is negative, the value stored in the integrator decreases.

When the value stored in the integrator is less than some positive threshold and greater than some negative threshold, no decision appears at the output of the decision device. On the other hand, when the value stored in the integrator is greater than the positive threshold, the 111 output, $g(t)$ from 105 in FIGURE 1, takes on a value indicating a positive (affirmative) decision; and when the value stored in the integrator is less than the negative threshold, the output, $g(t)$, takes on a value indicating a negative decision.

Figure 2:
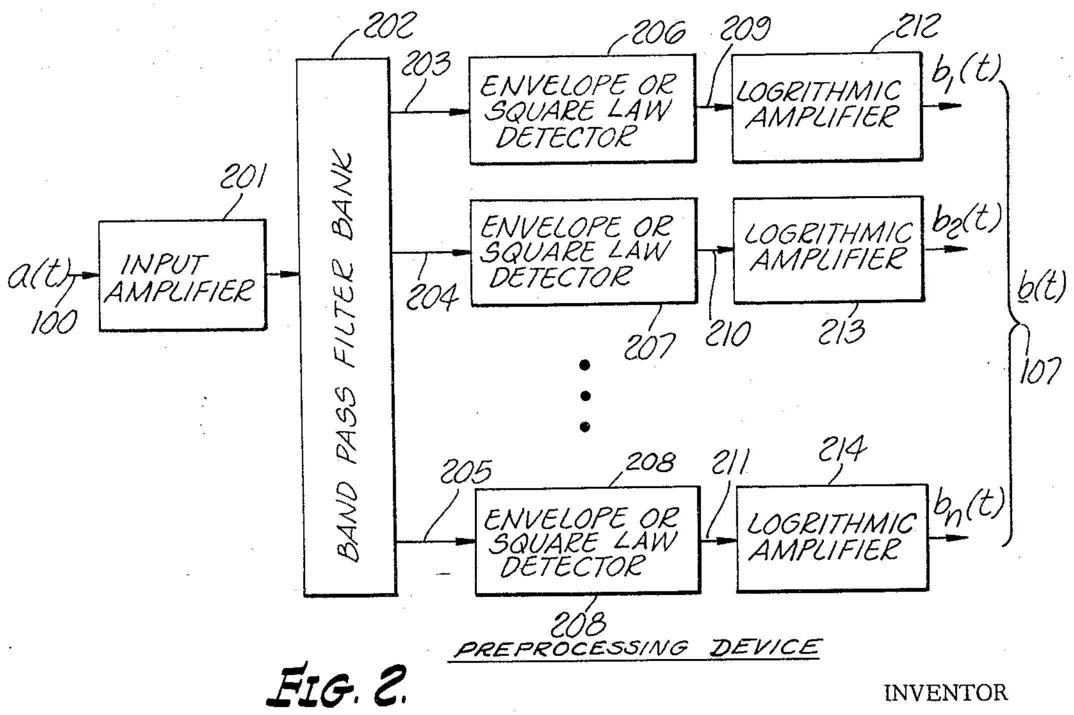
FIGURE 2 is a functional block diagram of the Preprocessing Device of FIGURE 1.

Proceeding now to FIGURE 2, a block diagram is shown illustrating a typical preprocessing device, suitable for 101 of FIGURE 1. This device consists of an input amplifier 201, a bank of band-pass filters 202, a set of envelope detectors 206, etc., and a set of logrithmic amplifiers 212 etc.

The input amplifier is a state-of-the-art audio frequency amplifier, the function of which is to act as a buffer amplifier and to provide signals of sufficient amplitude so that the said logrithmic amplifiers can operate in a convenient dynamic range. These logrithmic amplifiers have a flattening output versus input response, i.e, their output amplitudes are proportional to the logarithm of their respective input amplitudes.

The output of the amplifier 201 is applied to a suitable, state-of-the-art band-pass filter bank. The band-pass filters should be able to divide the speech frequency spectrum into $n$ nonoverlapping individual pass-bands. There is no fixed requirement on the number of band-pass filters, and no fixed requirement on the total frequency range that should be covered. Furthermore, there is no fixed requirement on the frequency response of each filter. However, for satisfactory operation in speech preprocessing, about sixteen adjacent filters should be used, covering a total range of frequencies extending from at least as low as 300 cycles per second, to at least 2700 cycles per second. A linear scale of bandwidths or a logarithmic scale of bandwidths may be used to cover this frequency range, and the out-of-band attenuation should be greater than 30 decibels.

It should be understood from FIGURE 2 that there would be $n$ detectors such as 206, 207 and 208, and $n$ logarithmic amplifiers such as 212, 213, and 214, or in the example of $n=16$, there would be 16 of each of those elements corresponding to 16 outputs at 107$b(t)$ and 16 band-pass filters within 202.

The output of each filter in 202 is detected by a state-of-the-art envelope or square law detector 206 etc. Such detectors each consist of either a rectifier followed by a low-pass filter, or a square law device followed by a low-pass filter. The said low-pass filter cutoff frequency should be no greater than the bandwidth of the associated band-pass filter, and it should be no less than about 20 cycles per second.

The output of each of said detectors is seen to be applied to the input (209, 210, 211) of a corresponding logarithmic amplifier. These amplifiers can also be state-of-the-art devices. For proper operation, each of these amplifiers should operate over a dynamic input range from 50 to 60 decibels, and the output should be equal to the approximate logarithm of the applied input. The accuracy of the amplitude response is not critical, but the amplitude response should not change with time. A satisfactory accuracy is 0.2 decibel per decibel (deviation from an ideal logarithmic curve). A satisfactory stability is plus-or-minus 0.5 decibel.

Figure 3:
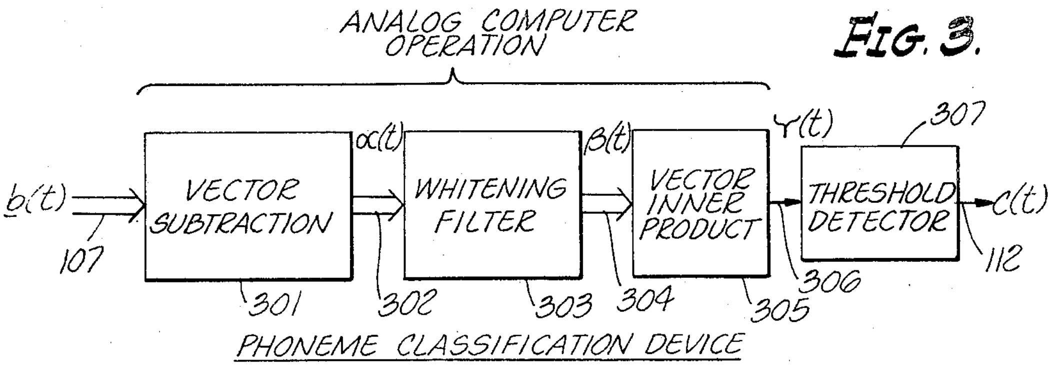
FIGURE 3 is a functional block diagram of the Phoneme Classification Device of FIGURE 1.

Referring now to FIGURE 3, a block diagram of the phoneme classification device 102 will be explained. The input to this device is the vector $b(t)$ (comprising $n$ signal leads), whose components $\{b_i(t)\}$ represent the current spectral content (at any given instant) of the speech sample applied to the input of the preprocessing device. The output 112 of the phoneme classification device is a binary switching function, $c(t)$, which, at any given instant of time, indicates whether or not the sample of speech should be classified during that time as a pronunciation of a particular predetermined phoneme.

The phoneme classification device 102 can be treated as an analog computing device, comprising 301, 303 and 305, which first computes the value of a likelihood function. The likelihood value represents the conditional probability density of th input vector $b(t)$, given that the current speech sample is a pronunciation of the chosen phoneme. The computed value is then applied to a threshold detector 307, whose function, at any given instant of time, is to specify whether or not the value of the likelihood function $\gamma(t)$ on lead 306 exceeds a given threshold.

The analog computer operation consists of three operations, namely, the subtraction (in 301) of a vector $m$ from the vector $b(t)$, producting $\alpha(t)$.

The multiplication of the vector $\alpha(t)$ by a matrix N (an operation called "whitening"), develops $\beta(t)$.

The formation of the inner product of the vector $\beta(t)$ with itself, is as follows:

$$\gamma(t)=\beta^T(t)\beta(t), \left(\gamma(t)=\sum_{i=1}^{n}\beta_i^2(t)\right)$$

where $\beta^T(t)$ represents the transpose of the vector $\beta(t)$.

The vector $m$ is the conditional mean vector for the stochastic process $b(t)$, given that the speech sample applied to the input of the preprocessing device is a pronunciation of the phoneme to be recognized. The components of $m$ may be evaluated experimentally by applying statistically representative samples of speech to the input of the preprocessing device and by evaluating the sample mean for each corresponding component of $b(t)$.

The matrix multiplication is performed by a device 303 called a whitening filter. The matrix N is a matrix which transforms the vector $\alpha(t)$ to a vector $\beta(t)$ so that the conditional covariance matrix of $\beta(t)$, given that the speech applied to the input of the preprocessing device is a pronunciation of the phoneme to be recognized, is the identity matrix. That is, whenever the phoneme is pronounced, the components of $\beta(t)$ are statistically independent and have unit average power. The elements of the matrix N can be derived by applying statistically representative samples of pronunciations of the phoneme to be recognized to the input of the preprocessing device and by evaluating the sample covariance matrix of the vector process $\alpha(t)$. One then follows a known mathematical procedure to diagonalize the inverse of the sample covariance matrix, to normalize the resulting matrix, and to evaluate N.

Alternatively, both the mean vector $m$ and the desired matrix N may be found by a more direct method. If statistically representative speech samples are applied to the input of the preprocessor 101, the adaptive classification device can be used to evaluate $m$ and N. In order to do this, one must manually operate the switching signal $d(t)$ so that the adaptive processes is enabled whenever the phoneme of interest occurs in speech samples. The required value of the components of $m$ can then be measured directly from corresponding values generated within the adaptive classification device. Also, the elements of the matrix N can then be found by applying unit singals to certain points within the adaptive classification device and by measuring the corresponding signals generated at other points within this device.

Figure 4:
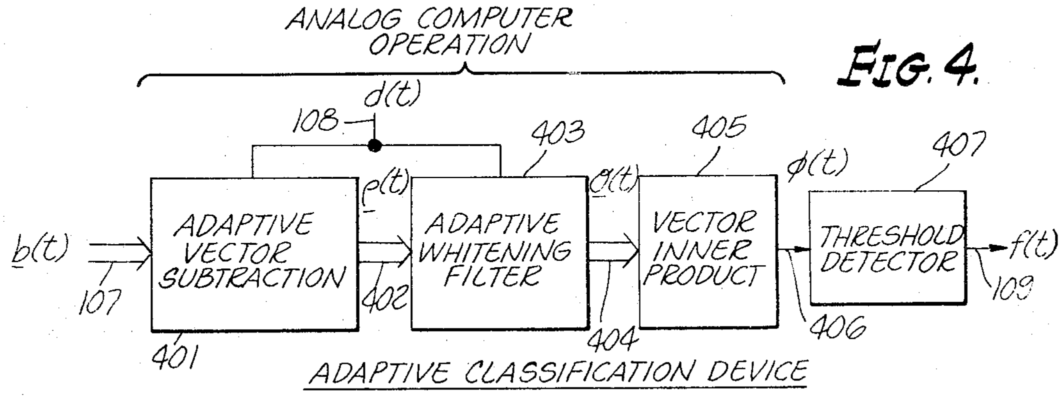
FIGURE 4 is a functional block diagram of the Adaptive Classification Device of FIGURE 1.

Referring now to FIGURE 4, the block 103 of FIGURE 1 will be described in more detail. Specifically, the adaptive classification device also operates on $b(t)$ by subtracting a vector $\mu$ and then multiplying the result by a matrix W, as shown in FIGURE 4. The significant difference between the phoneme classification device and the adaptive classification device is that in the learning mode of operation, the components of $\mu$ and the elements of W automatically change to correspond to the statistical behavior of $b(t)$ whenever the switching signal $d(t)$ is turned on. Thas is, $\mu$ and W will slowly change so that $\rho(t)$ has zero mean and $\sigma(t)$ has statistically independent components of unit average power for whatever statistical behavior is exhibited by $b(t)$ during the intervals of time when the switching signal $d(t)$ has been turned on. Thus, after a suitable sampling period, $d(t)$ may be turned off, and the potentials corresponding to the components of $\mu$ can be measured. The elements of the matrix W can also be measured by applying unit potentials to each component of $\rho(t)$ in turn and by measuring the corresponding sets of components of $\sigma(t)$. That is, if $$\rho_i(t)=1$$

$$\rho_j(t)=0$$

for some $i$ and for all $j\neq i$, then $$\sigma_k(t)=W_{ki}$$

for $k=1, 2 \ldots n$.

For the phoneme classification device 102, any state-of-the-art analog computer technique can be used to implement those mathematical operations described. Also, any digital computing technique can be employed to implement those operations, providing only that the output $c(t)$ is essentially a real time function of the input $b(t)$. There are no severe requirements of accuracy for the computer operations.

Figure 5:
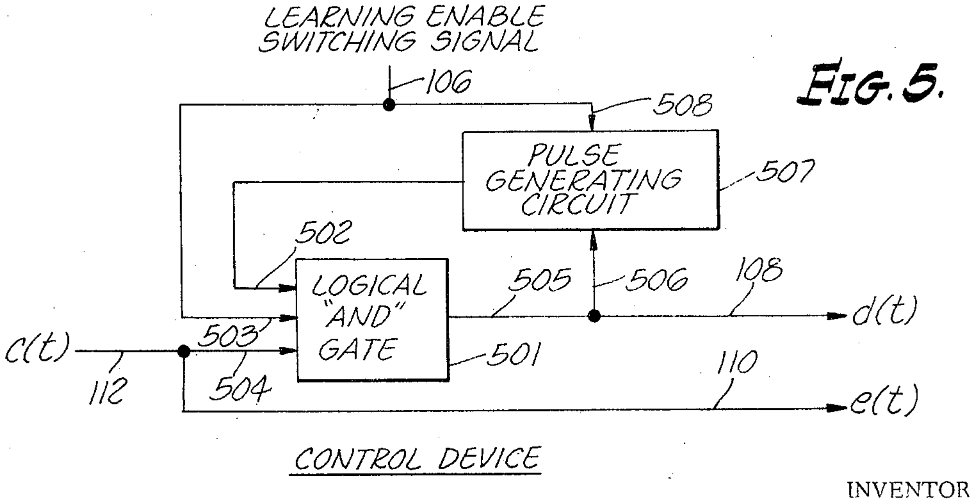
FIGURE 5 is a functional block diagram of the Control Device of FIGURE 1.

FIGURE 5 is a block diagram showing a method of implementation for the control device 104. The learning enable switching signal on 106 is a D.C. potential which has a value corresponding to the logical "one" when the learning enable switch is on and a value corresponding to the logical "zero" when the learning enable switch is turned off. The input $c(t)$ on 112 from the phoneme clasification device 102 is a D.C. potential having a value corresponding to the logical "one" whenever the correct predetermined phoneme is being pronounced, and the logical "zero" whenever the phoneme is not being pronounced.

The output $d(t)$ is non-zero on 108 only when the learning enable switching signal on 106 takes on a potential representing the logical "one" and, simultaneously, the input signal $c(t)$ on 112 also takes on a potential representing the logical "one." When both of these inputs represent the logical "one," the output $d(t)$ consists of a rapid sequence of pulses the frequency of which is constant but whose duty cycle is variable. When the learning enable switch is first turned on, the duty cycle is close to unity. Thereafter, the duty cycle decreases in an exponential fashion to zero over a period equal to the total elapsed time during which the input signal $c(t)$ has taken on the value representing the logical "one." This is accomplished by applying at lead 504 the input signal $c(t)$ from 112 the learning enable switching signal via lead 503, and a signal from a pulse generation circuit 507 to a logical "and" gate 501 via lead 502, as shown in FIGURE 5. $c(t)$ Is also passed on at 110 as $e(t)$ which goes via lead 110 to the decision device 105. The said pulse generator 507 is in turn controlled by the learning enable switching signal at 508 and a bootstrap pulse from the 501 output at 505 via 506 (which is the same signal as $d(t)$ at 108.).

Figure 6:
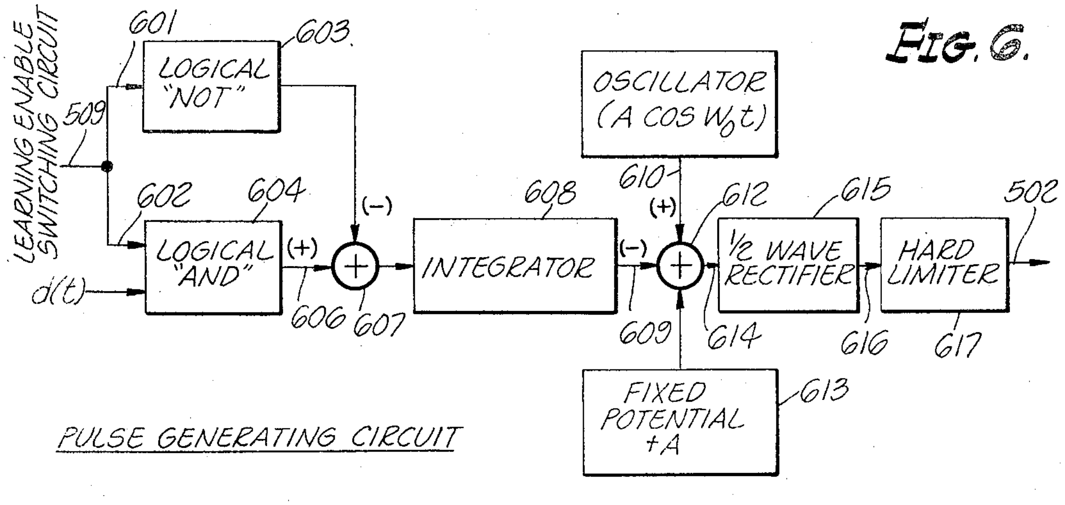
FIGURE 6 is a functional block diagram of the Pulse Generating Circuit of FIGURE 5.

FIGURE 6 is a block diagram showing how the pulse generation circuit can be implemented.

Pulses having a 50 percent duty cycle can be generated by applying the output of an oscillator 618 via lead 610, adder 612 and lead 614 to a half wave rectifier 615, via 616 to a hard limiter 617, and with suitable amplification amplifier (not shown) to the 502 output. If the oscillator output is biased by adding a D.C. potential of the same peak amplitude from 613 via 611 and adder 612, the duty cycle of the pulses produced at the output will be increased to 100 percent. If the oscillator output is also biased via another potential into 612 via lead 609, this amounting to subtraction of a potential equal to the value stored in an integrator 608, the duty cycle of the pulse train can be decreased from 100 percent to zero, according to the magnitude of the value stored in the integrator 608.

As shown in FIGURE 6, when the 601 input learning enable switch (signal into 601 and 602) is turned off, the output of the logical "not" circuit 603 is a potential representing the logical "one" and vice versa. If this signal via lead 605 is subtracted in adder 607 from the integartor 608 input, the value stored in the integrator is effectively set to zero, and the pulse train at the output of the hard limiter has an effective duty cycle of one (i.e., a D.C. potential is developed). When the learning enable switch is turned on, the output of the logical "not" circuit 603 is effectively zero ,and the corresponding potential is no longer subtracted from the integrator. On the other hand, each time the phoneme is recognized, the signal $c(t)$ (refer to FIGURE 5) takes on a potential representing the logical "one," and $d(t)$, the potential developed at the output 108 of the logical "and" gate in FIGURE 5, represents the logical "and." This signal is added to the integrator via another "And" circuit 604 and lead 606 each time the phoneme is recognized and tends to increase the value stored in the integrator.

Initially, the duty cycle of the train of pulses $d(t)$ is unity, and the value stored in the integrator increases at a maximum rate. This decreases the duty cycle of the pulse train at the output 502 of the pulse generating circuit, and implicitly, the rate at which values are accumulated in the integrator. Thus, the duty cycle at the output of the pulse generating circuit tends to decrease exponentially (for constant $c(t)$, but also it decreases only when the phoneme is being recognized (i.e., when $c(t)$ is "on").

Figure 7:
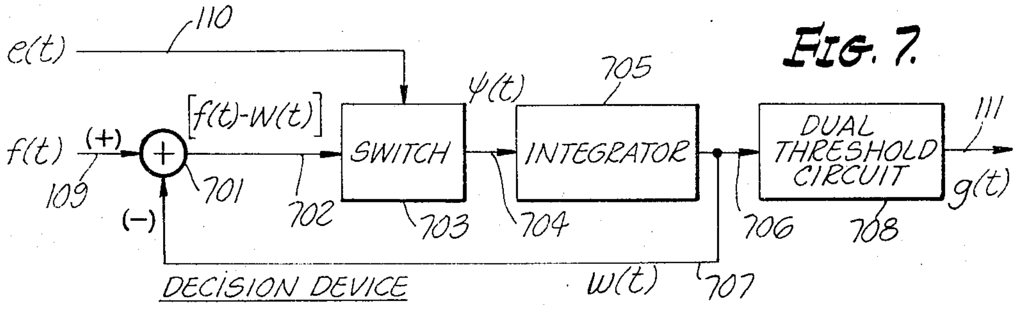
FIGURE 7 is a functional block diagram of the Decision Device of FIGURE 1.

FIGURE 7 is a block diagram showing the decision device 105. The inputs to this circuit are $e(t)$ at 110 and $f(t)$ at 109, $e(t)$ is a potential whose value represents the logical "one" whenever the correct phoneme is being pronounced and the logical "zero" whenever the correct phoneme is not being pronounced. The input $f(t)$ has a fixed position potential whenever the speaker is identified by the adaptive classification device as the correct speaker and a fixed negative potential whenever the speaker is not identified as the correct speaker.

The potential $\omega(t)$. which represents the value currently stored in the integrator 705, is fed back via 707 to adder 701 and there subtracted from the input potential $f(t)$. The difference potential on lead 702 $[f(t)-\omega(t)]$, is applied to the switching circuit 703. The function of this switching circuit is to produce an output potential equal to $[f(t)-\omega(t)]$ whenever the potential $e(t)$ represents the logical "one" and an output potential of zero whenever the potential $e(t)$ represents the logical "zero."

The output on lead 704 of this switching circuit 703, identified as $\psi(t)$, is applied to the input of integrator 705. The function of this integrator is to continuously integrate the input potential with respect to time. Thus, the value stored in the integrator, which is also equal to the output potential $\omega(t)$, is given by $$\omega(t)=k\int_{-\infty}^{t}\psi(\tau)d\tau$$

where K is a time constant.

The output of the integrator, $\omega(t)$, is applied to a dual threshold circuit 708. The function of this circuit is to produce an output $g(t)$ on lead 111 whose potential is equal to a fixed positive value whenever $\omega(t)$ exceeds a positive threshold value, conversely a fixed negative potential whenever $\omega(t)$ is less than a negative threshold, or zero potential whenever $\omega(t)$ has a value that lies between the two thresholds. An alternative instrumentation would let the output $g(t)$ be specified by two outputs, $g_1(t)$ and $g_2(t)$, where $g_1(t)$ assumes a fixed potential whenever $\omega(t)$ exceeds the positive threshold and zero potential otherwise, and where $g_2(t)$ assuming a fixed potential whenever $\omega(t)$ is less than the negative threshold and zero potential otherwise. These $g_1(t)$ and $g_2(t)$ could then be applied to separate indicator lights, one representing a positive decision regarding speaker identity, and the other representing a negative decision regarding speaker identity, in lieu of the yes/no output of 708 at lead 111.

The decision device operates in the following way. Each time the unknown speaker pronounces the phoneme chosen for the recognition process, the phoneme classification device 102 normally recognizes that the phoneme is being pronounced, and momentarily switches the output signal $c(t)$ from a potential representing the logical "zero" to a potential representing the logical "one." This signal is transmitted through the control device 104 and appears at the output as $e(t)$. In the decision device 105, $e(t)$ causes the switch to close, and the contents of the integrator 705 to be either increased or decreased by an amount proportional to the difference $[f(t)-\omega(t)]$. $f(t)$ Represents a decision regarding the identity of the speaker. If the decision happens to be positive, the potential $f(t)$ will be positive, and the stored contents of the integrator 705 will be increased. Otherwise the contents of the integrator will be decreased. If the speaker is the proper (same) speaker, the potential $f(t)$ will normally be positive more often than it is negative during the momentary time intervals when the phoneme is being recognized, and the value stored in the integrator will tend to increase. As the signal $\omega(t)$ increases, the difference $[f(t)-\omega(t)]$ tends to decrease, and the incremental amounts added to the integrator 705 also tend to decrease so that the value of $\omega(t)$ cannot exceed the positive value of $f(t)$. Similarly, the value of $\omega(t)$ cannot be less than the negative value of $f(t)$. However, if the value of $f(t)$ is positive for a greater percentage of time than it is negative, the value of $\omega(t)$ will increase to a small percentage of the positive value of $f(t)$ and eventually exceed the positive threshold value of the dual threshold circuit 708. Similarly, if the value of $f(t)$ is negative more often than it is positive, the value of $\omega(t)$ will decrease to a small percentage of the negative threshold value of the dual threshold circuit.

Returning now to FIGURE 4, the functional block diagram showing the adaptive classification device can now be explained. This device, like the phoneme classification device, is fundamentally an analog computer comprising 401, 403 and 405 that continuously computes the value of a likelihood function $\phi(t)$ and applies this value on lead 406 to a threshold detector 407. However, in the learning mode of operation the likelihood function itself (the relationship between the input, $b(t)$ on 107 and the function $\phi(t)$ on 406) is permitted to vary, automatically, so that it corresponds to the statistical behavior of $b(t)$ in a predetermined way.

The changes that take place in the input-output relationship only take place in the adaptive vector subtraction unit 401 and in the adaptive whitening filter 403.

The vector inner product operation in 405 and the threshold detector 407 operation remain unchanged.

Figure 8:
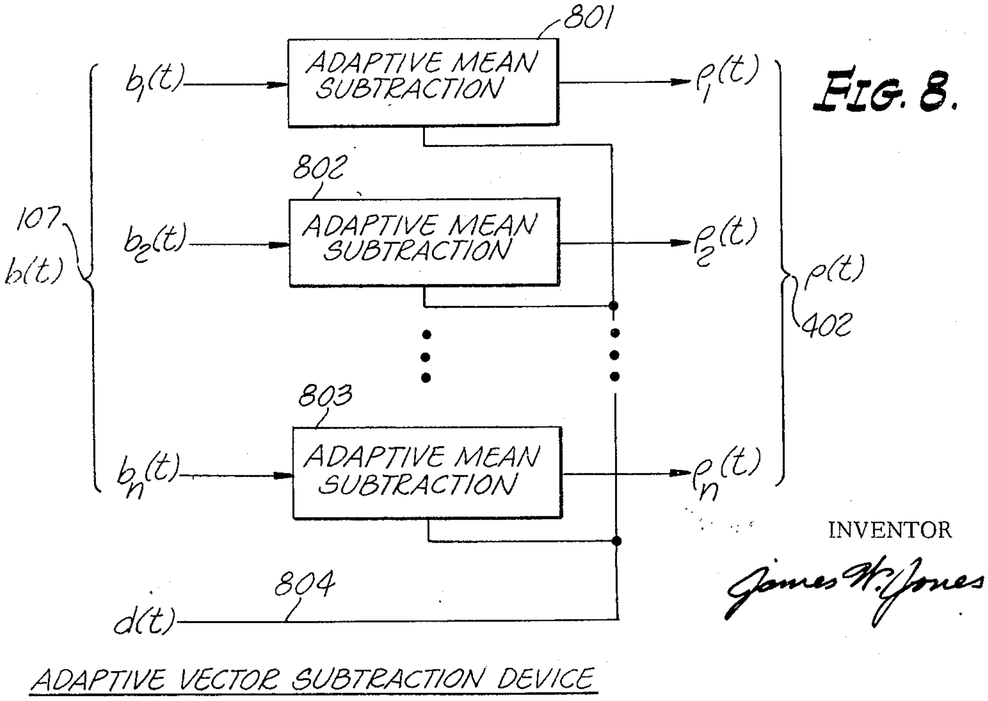
FIGURE 8 is a functional block diagram of the Adaptive Vector Subtraction Device of FIGURE 4.

FIGURE 8 is a block diagram showing details of the adaptive vector subtraction unit. The input vector, $b(t)$ on 107, consists of a set of time-varying potentials $\{b_i(t)\}$. During those intermittent intervals of time when the chosen phoneme is being pronounced, the statistical behavior of the components of $b(t)$ not only depends upon the phoneme, but also upon the speaker who is pronouncing that phoneme. In the recognition mode of operation, the function of the adaptive vector substraction device is to subtract $m_i$, the conditional mean value of the vector component $b_i(t)$ (given that the speaker to be recognized is pronouncing the chosen phoneme), from the corresponding component $b_i(t)$. In the learning mode of operation, the function of the adaptive vector subtraction device is to adjust the conditional mean value, $m_i$, which is subtracted from each component $b_i(t)$ so that the corresponding output component, $\rho_i(t)$, has zero mean value whenever the chosen phoneme is being pronounced. This subtraction is carried on within adaptive mean subtraction units such as 801, 802, 803.

Figure 9:
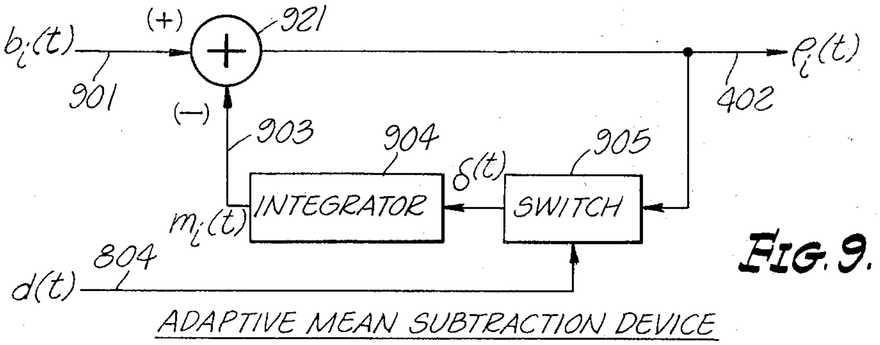
FIGURE 9 is a functional block diagram of the Adaptive Mean Subtraction Device of FIGURE 8.

FIGURE 9 is a block diagram showing details of these adaptive mean subtraction devices. $m_i(t)$, The value currently stored in the integrator 904, is supplied to an added 921 via lead 903 and there is subtracted from the input signal $b_i(t)$ on 901 to produce the output $\rho_i(t)$ at 402. This output is applied to the electronic switch 905 which is controlled by the signal $d(t)$ on 804. The signal $d(t)$ is non-zero only during those intervals of time when the phoneme is being recognized. However, when the phoneme is being recognized, the signal $d(t)$ is a periodic sequence of positive pulses with a decreasing duty cycle. The switch is normally open (when $d(t)$ is zero). However, when $d(t)$ takes on a positive potential, the switch 905 closes and $\rho_i(t)$ is applied to the input of the integrator via 906.

The function of the integrator is to form the integral $$m_i(t)=\int_0^t \delta(\tau)d\tau$$

Since, as has been said, the switching signal $d(t)$ consists of a sequence of pulses with a variable duty cycle, the duty cycle of $d(t)$ tends to act as a weighting function for the integration of $\rho_i(t)$. The control device 104 (FIGURE 1) produces a form of exponential weighting for the duty cycle, so that it can be assumed that the duty cycle may be approximated by the time function $(1/t)$, where the learning control signal is first switched on at $t=0$. Thus, $$m_i(t)\cong\int_0^t \frac{1}{\tau}[b_i(\tau)-m_i(\tau)]d\tau$$

This equation can be differentiated with respect to time, rearranged, and then integrated with respect to time to produce $$m_i(t)=\frac{1}{t}\int_0^t b_i(\tau)d\tau$$

showing than $m_i(t)$ is the sample mean value of the function $b_i(t)$ over the time interval $(0, t)$.

Figure 10:
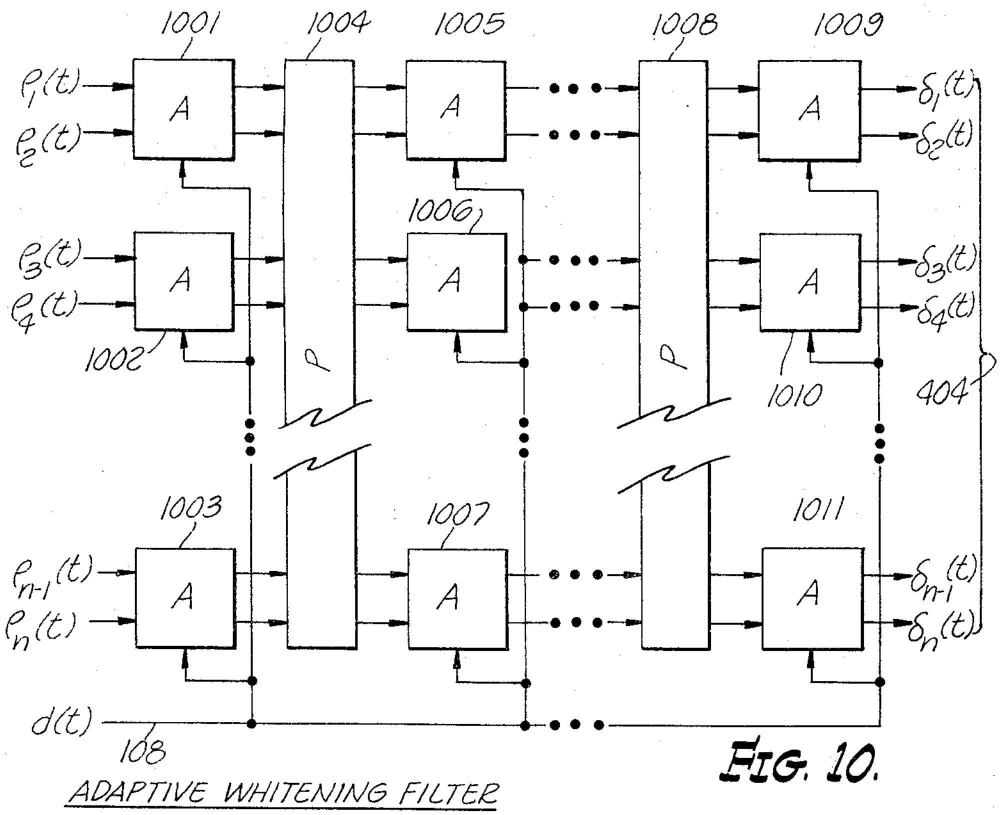
FIGURE 10 is a functional block diagram of the Adaptive Whitening Filter of FIGURE 4.

FIGURE 10 is a block diagram showing the adaptive whitening filter. The function of this device is to convert the set of input variables $\rho_i(t)$ at 402 to a set of output variables at 404 which are statistically independent and have unit variance (unit average power) whenever the speaker to be recognized pronounces the chosen phoneme. Mathematically, the required operation multiplies the vector $\rho_i(t)$, whose components are $\{\rho_i(t)\}$ by a matrix W whose elements are $\{w_{ij}\}$ to produce the output vector $\sigma(t)$ whose components are $\{\sigma_i(t)\}$. To accomplish this in an adaptive fashion, it is performed by operating on pairs of the variables with the adaptive transformation elements labeled A, as shown in FIGURE 10. To avoid repeating the operation A on the same pair of variables, the variables are arbitrarily permuted (with the operation labeled P in FIGURE 10) between the operations labeled A. The permuted variables are then applied to a subsequent set of adaptive transformation elements followed by a second permutation, and so on. The number of permutations and successive pairwise transformations is not critical; however, the number should be sufficient so that each output $\tau_i(t)$ is at least a linear combination of all $n$ of the inputs $$\rho_1(t),\ \rho_2(t)\ \ldots\ \rho_n(t)$$

Thus, for $n=2$, one pairwise transformation element, A, and no permutation, P, is required. For $n=4$, there should be at least four transformation elements, A, and one permutation P. For $n=8$, there should be at least twelve transformation elements (four in each column as illustrated by FIGURE 10) and two permutations, such as 1004 and 1008. For $n=16$, there should be thirty-two transformation elements, A (eight in each column) and three permutations. The columns of transformation elements are first 1001, 1002 through 1003, second 1005, 1006 through 1007, and 1009, 1010, through 1011, for the third column.

Figure 11:
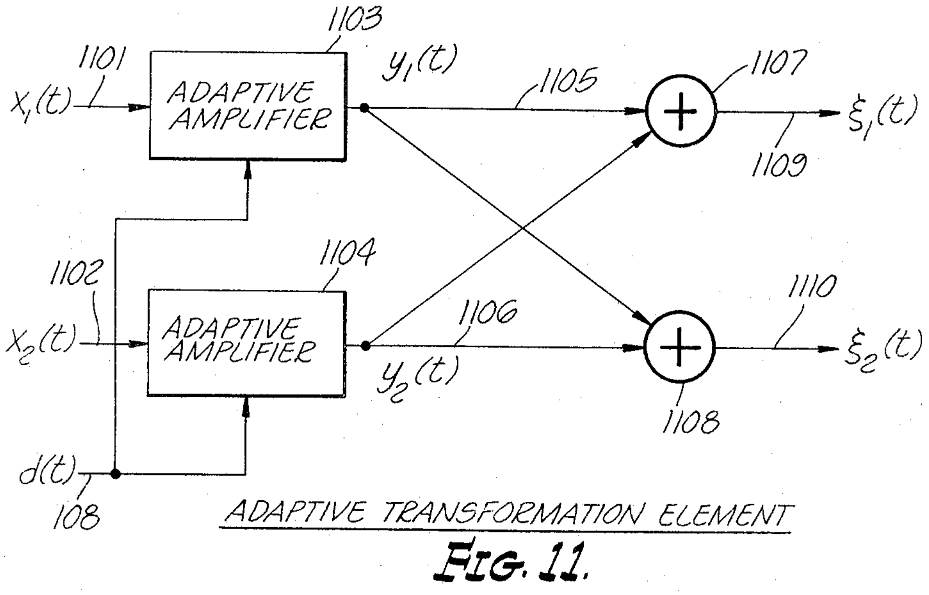
FIGURE 11 is a functional block diagram of the Adaptive Transformation Element of FIGURE 10.

The $d(t)$ signal on 108 will be functionally related by inspection of FIGURE 11.

FIGURE 11 is a block diagram showing the details of the transformation element of FIGURE 10. This element acts as an adaptive linear transformation so that correlated random processes applied to the input can be transformed into uncorrelated random processes at the output. That is, given that the speech sample $a(t)$ applied to the input of the system (FIGURE 1) is that of the speaker to be recognized, the random processes applied to the input of the transformation element, are in general, correlated, but after the learning operation, the random processes at the output of the transformation element are uncorrelated or statistically independent.

This is accomplished by applying each input typically 1101 and 1102 to adaptive amplifiers 1103 and 1104 respectively, and by forming the sum and difference on 1109 and 1110 of the two amplified random processes by cross addition in 1107 and 1108 via leads 1105 and 1106.

The device operates in the following way. In general, whenever the sample of speech applied to the input of the preprocessing sub-system is that of the speaker to be recognized, the random processes applied to the input of the adaptive amplifiers (1103 and 1104 typically) are cross correlated and have different average power. The gain of each adaptive amplifier automatically changes during the learning process so that the output process corresponding to the speaker to be recognized is normalized (has unit average power). By forming the sum and difference of the normalized output processes, two new random processes are obtained which are uncorrelated. This can be demonstrated as follows:

Let $x_1(t)$ and $x_2(t)$ be two random processes applied to the input of adaptive amplifiers.

It is assumed that $$E\{x_1^2(t)\}=\sigma_{11}$$

$$E\{x_2^2(t)\}=\sigma_{22}$$

$$E\{x_1(t)x_2(t)\}=\sigma_{12}$$

where E{ } represents the statistical expectation.

If the gain of the adaptive amplifier to which $x_1(t)$ is applied, is equal to $1/\sqrt{\sigma_{11}}$ and if the gain of the adaptive amplifier to which $x_2(t)$ is applied is $1/\sqrt{\sigma_{22}}$, then the statistical behavior of $y_1(t)$ and $y_2(t)$, the corresponding output processes from the adaptive amplifiers will be given by $$E\{y_1^2(t)\}=E\{x_1^2(t)\}/\sigma_{11}=1$$

$$E\{y_2^2(t)\}=E\{x_2^2(t)\}/\sigma_{22}=1$$

$$E\{y_1(t)y_2(t)\}=E\{x_1(t)x_2(t)\}/\sqrt{\sigma_{11}\sigma_{22}}=\sigma_{12}/\sqrt{\sigma_{11}\sigma_{22}}=\rho_{12}$$

where $\rho_{12}$ is the cross correlation coefficient of the random processes $x_1(t)$ and $x_2(t)$.

The random processes $y_1(t)$ and $y_2(t)$ are then added and subtracted to produce $z_1(t)$ and $z_2(t)$ as follows:

$$z_1(t)=y_1(t)+y_2(t)$$

$$z_2(t)=-y_1(t)+y_2(t)$$

Then, the statistical behavior of $z_1(t)$ and $z_2(t)$ is given by $$E\{z_1^2(t)\}=E\{y_1^2(t)\}+E\{y_2^2(t)\}+2E\{y_1(t)y_2(t)\}=2(1+\rho_{12})$$

$$E\{z_2^2(t)\}=E\{y_2^2(t)\}+E\{y_1^2(t)\}-2E\{y_1(t)y_2(t)\}=2(1-\rho_{12})$$

$$E\{z_1(t)z_2(t)\}=-E\{y_1^2(t)\}+E\{y_2^2(t)\}=0$$

Thus, the output processes $z_1(t)$ and $z_2(t)$ at 1109 and 1110 respectively, have different variances, but they are uncorrelated.

The signal $d(t)$ on 108 serves to control the adaptive processes so that the gain of each amplifier only charges when the chosen phoneme is being spoken by the speaker to be recognized.

Figure 12:
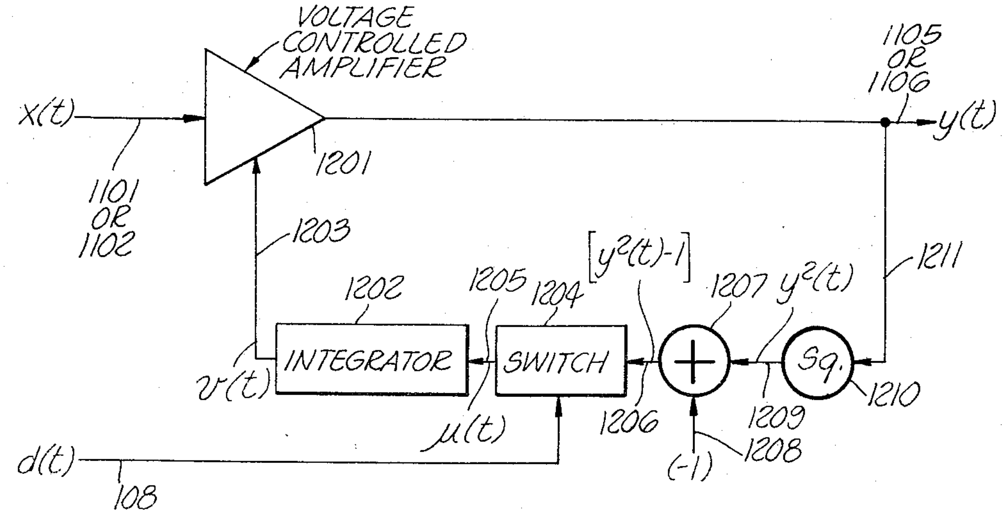
FIGURE 12 is a functional block diagram of the Adaptive Amplifier of FIGURE 11.

FIGURE 12 is a block diagram showing a method of implementing the adaptive amplifiers, such as 1103 and 1104. The input, $x(t)$, is applied to a voltage controlled amplifier 1201. The gain of this amplifier, in decibels, is equal to the value of the potential at the output 1203 of the integrator 1202. The output of the amplifier 1201, $y(t)$, is applied via 1211 to the square law device 1210. A constant unit potential at 1208 is subtracted from $y^2(t)$, the 1209 output of 1210 in adder 1207 and the result 1206 is applied to an electronic switch 1204. The switch is normally open, when the control potential $d(t)$ on 108 is zero.

Whenever the proper phoneme is being spoken, and, simultaneously, the learning enable switch is on, $d(t)$ consists of a sequence of pulses with a variable duty cycle which are then switched into the integrator 1202 via 1205. As is the case with the adaptive mean subtraction device (FIGURE 9), the duty cycle acts as a weighting function for the potential being inegrated by the integrator. During the learning cycle, the duty cycle tends to decrease, so that the weighting function can be approximated by $(1/t)$. Thus, the value stored in the integrator, represented by the output potential $v(t)$ is given by:

$$v(t)=\int_0^t \frac{1}{\tau}[y^2(\tau)-1]d\tau$$

By differentiating rearranging, and then integrating, we may convert the above equation to the following form:

$$e^{kv(t)}=\frac{1}{t}\int_0^t x^2(\tau)d\tau$$

showing that the potential stored in the integrator is the logarithm of the sample variance of the input process $x(t)$. This is the desired function, since the amplifier voltage gain control function is equal to the exponential function of $v(t)$ at 1203. The constant K should have the value (−½).

The permutation process is carried out simply by exchanging the leads carrying the potentials as appropriate (i.e., interchanging P block inputs on FIGURE 10). There is no unique sequence of permutations required for this operation, since it has been proven mathematically by the inventor that a randomly chosen sequence of permutations produces satisfactory results. However, preferred sequences of permutations can be specified. These are merely specified so that a path can always be traced from every input $(\rho_i(t)$ to each output $\sigma_j(t)$. (See FIGURE 10.)

For 16 components ($n$=16 in FIGURE 10), the following sequence of three permutations can be considered to be one of the preferred permutation sequences:

$P_1$=(1, 3, 2, 4, 5, 7, 6, 8, 9, 11, 10, 12, 13, 15, 14, 16)
$P_2$=(16, 2, 3, 5, 4, 6, 7, 9, 8, 10, 11, 13, 12, 14, 15, 1)
$P_3$=(1, 7, 14, 4, 5, 11, 2, 8, 9, 15, 6, 12, 13, 3, 10, 16)

The above numbers can be interpreted as follows:

The input variables to a given permutation are listed in order (1,2 . . . 16) from top to bottom in a diagram. The output variables are identified, in proper order, in terms of the indices of the corresponding input variables. For example, for permutation $P_1$, above, the first output variable is the first input variable, the second output variable is the third input variable, the third output variable is the second input variable, and so on.

The vector inner product operation in FIGURE 4 is identical to the operation described with reference to the phoneme classification device in FIGURE 3.

The threshold detector shown in FIGURE 4 is required to produce a positive potential whenever $\phi(t)$ exceeds a given threshold, or an equal negative potential whenever $\phi(t)$ is less than the given threshold. This latter instrument should be recognized as a state-of-the-art device.

While it is recognized that there are comparatively few skilled practioners in this art, the system processes will be evident to those of accomplishment in the information theory discipline. From the description it will also be evident that the elements of instrumentation are of themselves individually of types well known and readily constructed by the skilled practitioner once the system concepts are understood.

Variations and modifications of the embodiment disclosed will suggest themselves to those skilled in this art, and it is not intended that the scope of the invention be limited to the illustrations and description, which are presented for explanatory purposes only.

What is claimed is:

1. Electrical signal spectrum pattern recognition apparatus comprising: a plurality of circuits for generating a corresponding set of analog signals each representative of the instantaneous magnitude of a predetermined spectral component occurring within a preselected time interval in said signal; means responsive to said analog signals for generating a control signal whenever, and so long as, said set of analog signals matches, within a predetermined tolerance, a predetermined pattern of magnitudes within said set of analog signals; means responsive to said control signal and said set of analog signals for storing the individual instantaneous magnitudes in said set over a plurality of exposures thereby to provide a stored mean for each of said spectral components in said set; means for comparing the corresponding values in a new set of said analog signals with said stored mean values, for generating a recognition signal when said new set corresponds to the said stored values within a predetermined tolerance.

2. A device for speaker recognition by comparison of selected spectral properties of the speech waveform resulting when an unknown speaker enounced a preselected, phoneme with the corresponding spectral properties resulting from enunciation of the same phoneme by a known speaker, comprising: preprocessing means responsive to said speech waveform to convert said speech waveform into a set of time varying analog values representing the current spectral properties of said speech waveform; a phoneme classification device responsive to said analog values from said preprocessing means, for developing a control signal whenever and so long as said analog values from said preprocessing means correspond to the presence of the spectrum of a predetermined phoneme in said speech waveform; an adaptive classification device also responsive to said analog values from said preprocessing means, said adaptive classification device comprising a plurality of memory elements each capable of storing the mean value of a corresponding one of said analog values over a plurality of enunciations of said predetermined phoneme, thereby to store values statistically representative of the range of variations of said analog values over said plurality of enunciations; a decision device responsive to the output of said adaptive classification device for comparing currently stored mean levels of said set of analog values with a set of newly supplied analog values to develop an output signal indicating by a first condition thereof, correspondence of said newly supplied set with said means levels, and lack of correspondance of said newly supplied set with said mean levels by a second condition of said output signal; and switching means responsive to said control signal at the output of said phoneme classification device operative to prevent input signals from said preprocessing means from affecting said stored mean values, except when said control signal is generated by said phoneme classification device.

3. The invention set forth in claim 2 further defined in that said preprocessing means comprises a band-pass filter bank responsive to said speech waveform for dividing the spectrum thereof into *n* discrete bands, an envelope detector responsive to the signal within each of said spectrum divisions, and a logarithmic amplifier responsive to each of said detector outputs, thereby to produce said set of analog values which are time varying and representative of the spectral properties of each corresponding speech waveform sample.

4. The invention set forth in claim 3 further defined in that said phoneme classification device includes a vector subtraction device responsive to said set of time-varying analog values to produce a second set of time-varying analog values having zero mean value; whitening filter means comprising means to decorrelate the signals of said set and reduce them all to unit power, thereby to generate a third set of time-varying analog values; means responsive to said third set of time-varying analog values for squaring each of said values and summing said squared values to generate a fourth signal having a characteristic which is a function of the likelihood that a given set of spectral properties in said set of analog signals corresponds to the spectrum of said predetermined phoneme in said speech waveform; and threshold means responsive to said fourth signal for generating a go-or-no-go decision signal.

5. The invention set forth in claim 3 further defined in that said adaptive classification device comprises subtraction means responsive to said analog values from said preprocessing means for generating a set of time-varying analog values having zero mean value during said recognition mode, said subtraction means also including means to adjust stored vector components therein during the learning mode of operation, thereby to adapt said subtraction means to a subsequent recognition mode.

6. The invention set forth in claim 5 wherein said set of analog values having zero mean value during said recognition mode is impressed on a whitening filter which comprises a matrix multiplier operation for decorrelating said zero mean value set and reducing its components to unit power during said recognition mode, and means are included for modifying the coefficients of said matrix in accordance with the statistical spectral characteristics of said predetermined phoneme, thereby to make said whitening filter adaptive during said learning mode.

References Cited

UNITED STATES PATENTS

| | | | |
|---|---|---|---|
| 3,456,080 | 7/1969 | Torre. | |
| 3,466,394 | 9/1969 | French | 179—1 |

OTHER REFERENCES

Sandra Pruzansky: Pattern-Matching Procedure for Automatic Talker Recognition, Jour. of the Acoustical Soc. of Amer., vol. 35, No. 3, March 1963, pp. 354–358.

S. Pruzansky and M. V. Mathews: Talker-Recognition Procedure Based on Analysis of Variance, Jour. of the Acoustical Soc. of Amer., vol. 36, No. 11, November 1964, pp. 2041–2047.

KATHLEEN H. CLAFFY, Primary Examiner

C. W. JIRAUCH, Assistant Examiner

U.S. Cl. X.R.

324—77